(No Model.) 5 Sheets—Sheet 1.
R. D. GALLAGHER, Jr.
REFRIGERATOR.

No. 602,599. Patented Apr. 19, 1898.

Witnesses
Inventor:
Richard D. Gallagher, Jr.
By Dyrenforth and Dyrenforth,
Att'ys (No Model.) 5 Sheets—Sheet 3.
R. D. GALLAGHER, Jr.
REFRIGERATOR.

No. 602,599. Patented Apr. 19, 1898.

Witnesses:
Inventor:
Richard D. Gallagher, Jr.,
By Dyrenforth and Dyrenforth,
Attys.

(No Model.) 5 Sheets—Sheet 4.
R. D. GALLAGHER, Jr.
REFRIGERATOR.
No. 602,599. Patented Apr. 19, 1898.
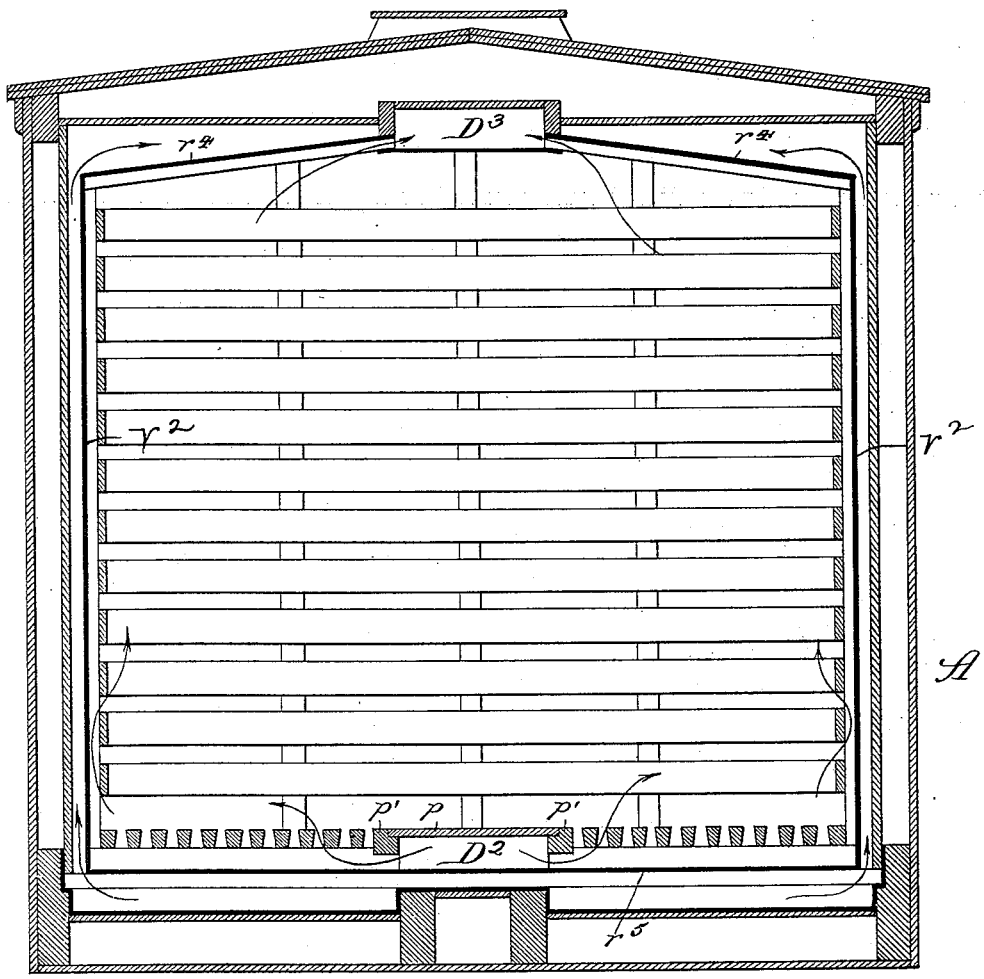
Witnesses: Inventor:
Richard D. Gallagher, Jr.
By Dyrenforth and Dyrenforth,
Att'ys (No Model.)  
R. D. GALLAGHER, Jr.  
REFRIGERATOR.  
5 Sheets—Sheet 5.
No. 602,599. Patented Apr. 19, 1898.
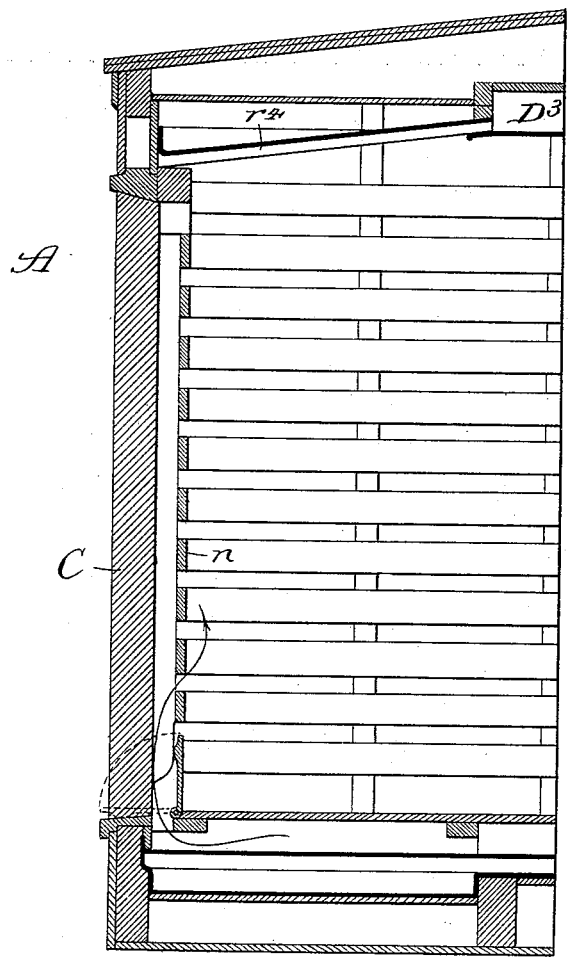

UNITED STATES PATENT OFFICE.

RICHARD D. GALLAGHER, JR., OF CHICAGO, ILLINOIS.

REFRIGERATOR.

SPECIFICATION forming part of Letters Patent No. 602,599, dated April 19, 1898.

Application filed May 14, 1896. Renewed December 13, 1897. Serial No. 661,758. (No model.)

*To all whom it may concern:*

Be it known that I, RICHARD D. GALLAGHER, Jr., a citizen of the United States, residing at Chicago, in the county of Cook and State of Illinois, have invented a new and useful Improvement in Refrigerators, of which the following is a specification.

My invention relates to an improvement in the class of refrigerators in which the refrigerating effect upon the material to be preserved in a storage-chamber is produced by the circulation of air-currents rendered cold by passing them in the course of their circulation through ice and by causing the iced air to circulate through a flue enveloping the storage-chamber and in contact with the conducting-wall of the flue, but without entering the chamber.

I intend my improvement for application to storage-chambers generally, thus including those of the transporting and stationary varieties. Inasmuch, however, as I have devised my improvement for more immediate use in connection with refrigerator-cars I have illustrated it as applied to a refrigerator-car in the accompanying drawings, in which—

Figure 1:
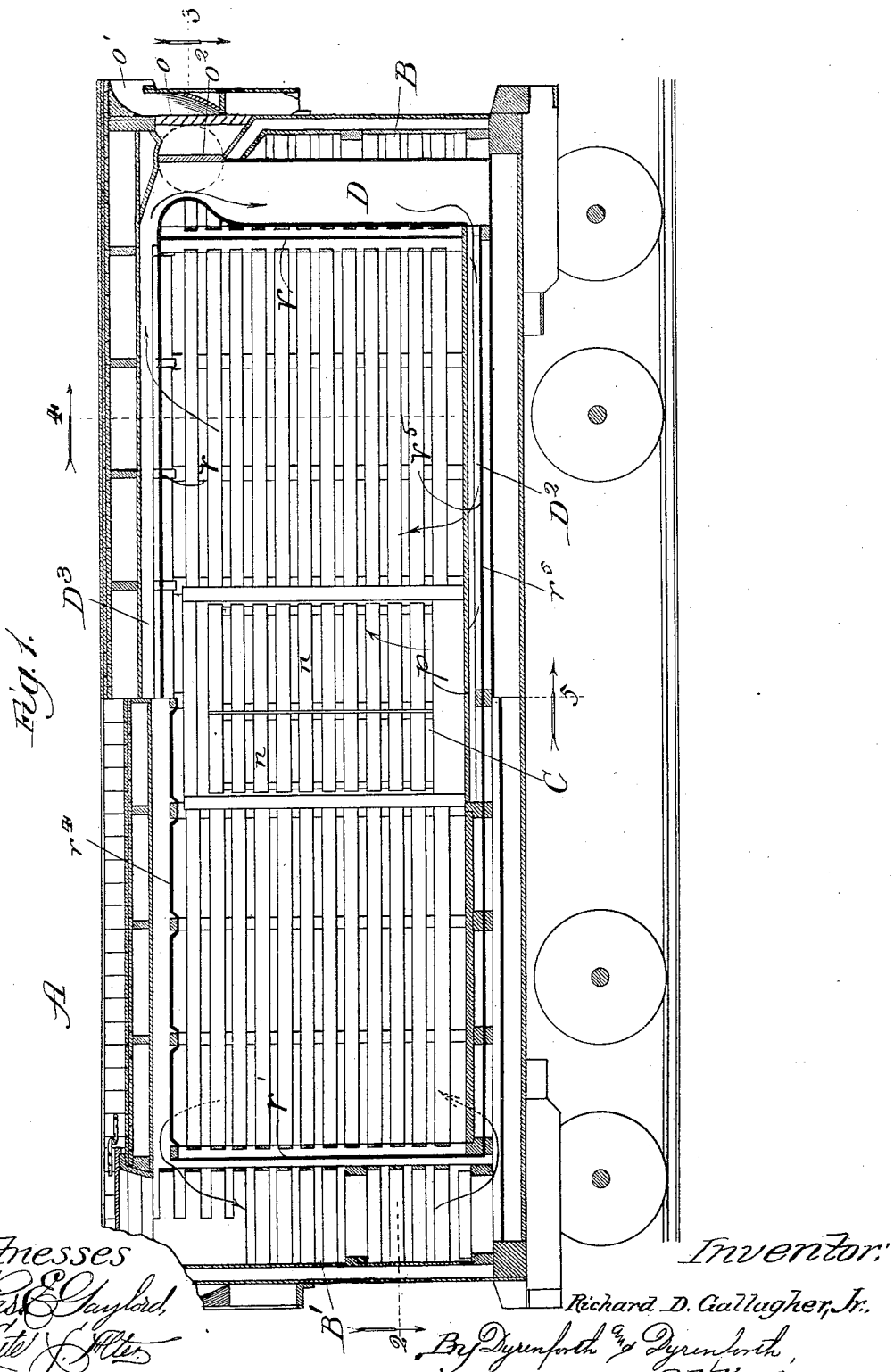
Figure 2:
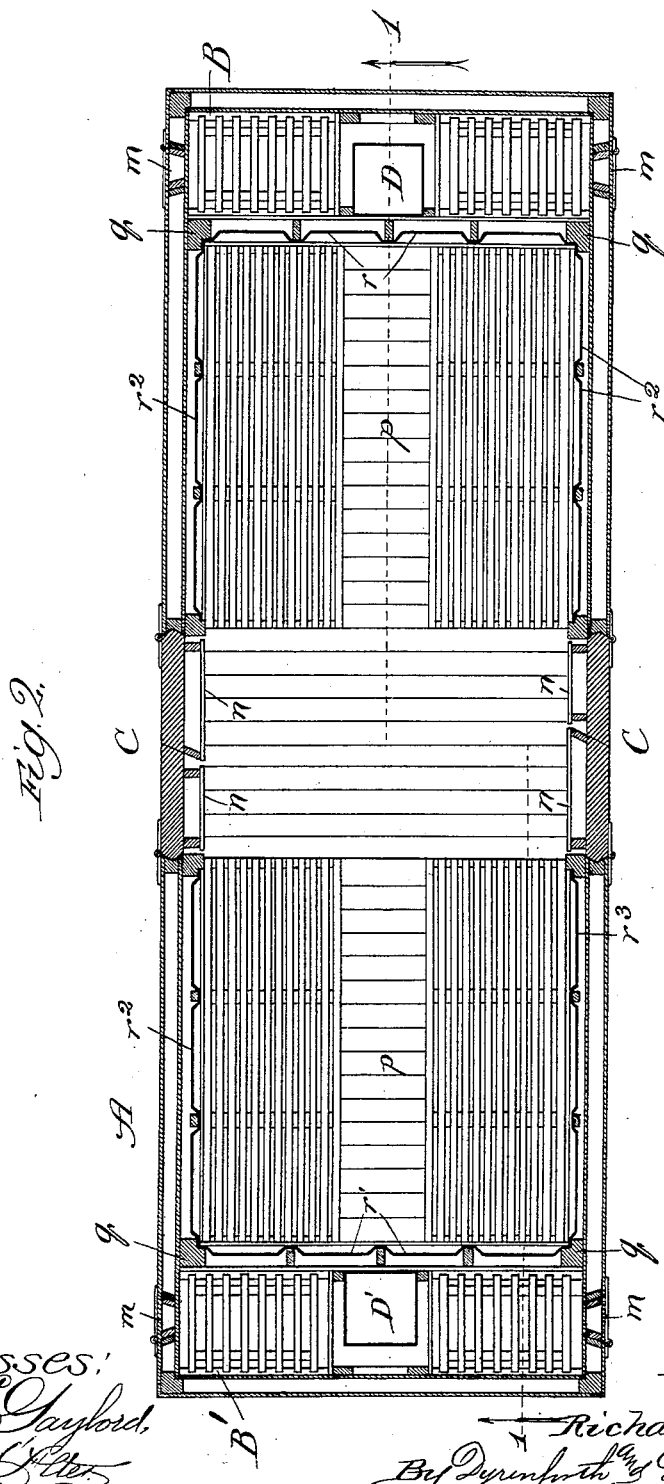
Figure 3:
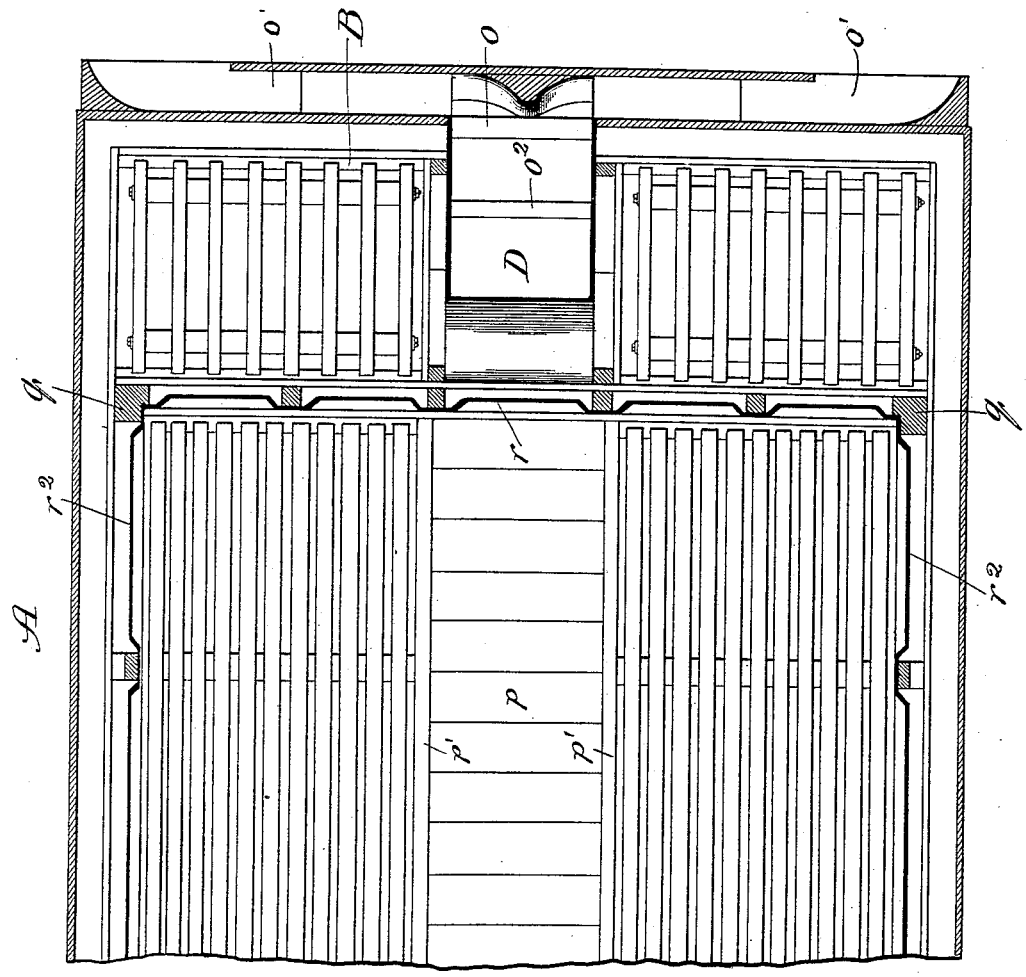

Figure 1 is a longitudinal sectional view of a refrigerator-car constructed in accordance with my improvement, the section being taken at the line 1 1 on Fig. 2 and viewed in the direction of the arrows; Fig. 2, a section of the same, taken at the line 2 on Fig. 1 and viewed in the direction of the arrow; Fig. 3, a section taken at the line 3 on Fig. 1 and viewed in the direction of the arrow; Fig. 4, a section taken at the line 4 on Fig. 1 and viewed in the direction of the arrow, and Fig. 5 a section taken at the line 5 on Fig. 1 and viewed in the direction of the arrow.

A is a railway-car, the general form and construction of the shell of which may be those of the ordinary or any suitable box-car. Within the car, and preferably at its opposite ends, I provide the ice-chambers B and B', equipped with suitable racks for supporting and confining the ice, and in front of these ice-chambers and spaced therefrom are the heat-conducting walls $r$ and $r'$, formed, preferably, of sheet metal, extending between posts $q\ q$ at the opposite sides of the car, and which close the spaces between the ice-compartments and conducting-walls at such sides. Conducting-walls $r^2$ and $r^3$, like the walls $r\ r'$, cover the inner sides of the car, from which they are spaced, as shown, and extend from each end to the adjacent sides of the openings for the doors C C. Along the ceiling of the car and spaced therefrom there extends a covering $r^4$ of heat-conducting material, (sheet metal,) the space afforded by it being open to the end spaces in front of the ice-compartments and having open communication with the spaces behind the side walls $r^2$ and $r^3$, and the bottom of the interior of the car is provided with a cover $r^5$, like that over the ceiling and similarly spaced, these spaces also having free communication with the spaces behind the side walls $r^2$ and $r^3$ and being open to the spaces behind the end walls $r$ and $r'$. By this construction it will be seen that with the ice contained in the compartments B and B' a continuous circulation of air will be occasioned through them and through the spaces above and below the coverings $r^4$ and $r^5$ and from the latter through the spaces behind the walls $r^2$ and $r^3$ and that none of the air thus circulated enters the storage-chamber afforded by the interior of the car, but that in passing over the exterior surfaces of the sheet metal it takes up the heat therefrom and condenses upon their inner surfaces the air within the storage-chamber, which carries the heat from the material stored therein. The spaces above and below the covers $r^4$ and $r^5$ and those behind the walls $r$ and $r'$, including the ice-compartments B and B', thus, as will be seen, afford a continuous air-flue, of which the spaces behind the side walls $r^2$ and $r^3$ are branches.

In the ice-compartments and located by preference centrally between the sides of each are the vertical air-flue sections D and D'. These open at the lower ends into a flue-section $D^2$, extending along the floor of the car over the covering $r^5$, and it may be formed by a narrow strip of closely-matched floor-boards $p$, supported on side sills $p'$, whereby the flue-section is open along its sides. At their upper ends the flue-sections D and D' open into a flue-section $D^3$, extending along the top of the interior of the car and dividing the cover $r^4$ and open along its sides to the interior of the car. The sections D, D', $D^2$, and $D^3$ thus form a continuous flue extending lengthwise throughout the car and into which the air in the storage-chamber enters from the sides of the flue-sections D² and D³ and is circulated throughout to distribute it against the conducting-surfaces of the walls of the extraneous air-flue, whereby the refrigerating effect upon the contents of the storage-chamber is greatly expedited and enhanced.

In the opposite ends of the car are shown screens o, covering openings leading into the flue-sections D and D' from end flues o' and which are covered by adjustable valves o². The provision of these valve-controlled openings is to permit the circulation of outside air through the internal flue and storage-chamber when it is desired to employ the car as a ventilated car, with or without refrigeration, as when it is desired to quickly reduce the temperature of warm material, such as strawberries, in the storage-chamber, recently picked from beds upon which the sun has been shining. In such a case the valves o² may be kept open for a few hours during the run of the car to cause the air from without to rush through the upper flue-section D³, or through all the sections of the entire inner flue, to quickly carry off a large portion of the heat in the storage-chamber.

The doors C at opposite sides of the car and between which the floor is shown solid, as in the case of the strip p, are hinged to open outward, and at their inner sides they are covered with slats n, spaced from their inner surfaces to tend, owing to the greater heat at this portion of the car, to increase the circulation of the air within the storage-chamber and by thus maintaining a body of air in motion against the inner surfaces of the doors to insulate the latter. It will also be noticed that the sheet-metal walls and coverings are protected inside the car by slatwork to prevent the stored material from coming into contact with them.

While I have throughout the foregoing description referred to the compartments B and B' as being designed to contain ice for the refrigerating effect of the latter, my improvement may, when used in very cold climates, particularly in connection with railway-cars, be employed to advantage for heating the storage-chamber by circulating currents of hot air through the flues. In such use of my improvement the compartments B and B' may be equipped with suitable heaters, the products of combustion from which will obviously be excluded from the interior of the storage-chamber the same as the iced air is excluded therefrom.

For the purpose of affording convenient access to these compartments when used to contain heaters for the regulation and control of the latter I provide the hinged doors m in their opposite sides.

What I claim as new, and desire to secure by Letters Patent, is—

1. In a refrigerator, the combination of a storage-chamber, and an external air-flue extending continuously about said chamber without communicating therewith and containing an ice-compartment, said flue having branches, at the sides of said chamber, closed where they meet the end portions of the flue and the inner walls of the flue being formed of sheet metal, or the like, and forming the end and side walls and top and bottom coverings of the storage-chamber, substantially as described.

2. In a refrigerator, the combination of a storage-chamber, an external air-flue extending about said chamber without communicating therewith and closed to the external atmosphere and containing an ice-compartment, and an internal air-flue, of which said chamber forms a part and having communicating with said chamber a vertical flue-section in contact with said ice-compartment, substantially as described.

3. In a refrigerator, the combination of a storage-chamber, an external air-flue extending about said chamber without communicating therewith and closed to the external atmosphere and containing an ice-compartment, and an internal air-flue consisting of said chamber and flue-sections D, D' and D³, said sections D and D' being in contact with said ice-compartment, substantially as and for the purpose set forth.

4. In a refrigerator, the combination of a storage-chamber, an external air-flue extending about said chamber without communicating therewith and closed to the external atmosphere, and an internal air-flue consisting of the storage-chamber and the intercommunicating flue-sections D, D', D² and D³ communicating with said storage-chamber, said flue having valve-controlled openings at its opposite ends leading to the outside air, substantially as and for the purpose set forth.

5. In a refrigerator, the combination of a storage-chamber, an external air-flue extending continuously about said chamber without communicating therewith and having compartments B and B' in its opposite end portions, said flue having branches, at the sides of said chamber, closed where they meet the end portions of the flue, and the inner walls of the flue being formed of sheet metal, or the like, and forming the end and side walls and top and bottom coverings of the storage-chamber, and an internal air-flue, of which said chamber forms a part and having a section in each said compartment, a section extending along the top of the chamber and a section extending along the floor of the chamber and formed with a strip p expanded between the car-doors, substantially as and for the purpose set forth.

RICHARD D. GALLAGHER, JR.

In presence of—
J. H. LEE,
R. T. SPENCER.